(12) United States Patent
Winkes

(10) Patent No.: US 11,846,109 B2
(45) Date of Patent: Dec. 19, 2023

(54) ASSEMBLY COMPRISING A FIRST AND A SECOND MEMBER AND A CONNECTOR, AND A METHOD OF ASSEMBLING SUCH AN ASSEMBLY

(71) Applicant: C1 CONNECTIONS B.V., The Hague (NL)

(72) Inventor: Jasper Winkes, The Hague (NL)

(73) Assignee: C1 CONNECTIONS B.V., The Hague (NL)

( * ) Notice: Subject to any disclaimer, the term of this patent is extended or adjusted under 35 U.S.C. 154(b) by 0 days.

(21) Appl. No.: 17/795,445

(22) PCT Filed: Jan. 29, 2021

(86) PCT No.: PCT/NL2021/050058
§ 371 (c)(1),
(2) Date: Jul. 26, 2022

(87) PCT Pub. No.: WO2021/154080
PCT Pub. Date: Aug. 5, 2021

(65) Prior Publication Data
US 2023/0069473 A1      Mar. 2, 2023

(30) Foreign Application Priority Data

Jan. 30, 2020   (NL) .................................... 2024795

(51) Int. Cl.
*E04H 12/08*   (2006.01)
*E02B 17/02*   (2006.01)
*E02B 17/00*   (2006.01)

(52) U.S. Cl.
CPC ......... *E04H 12/085* (2013.01); *E02B 17/027* (2013.01); *E02B 2017/0043* (2013.01); *E02B 2017/0091* (2013.01)

(58) Field of Classification Search
CPC ................ E04H 12/085; E02B 17/027; E02B 2017/0065
See application file for complete search history.

(56) References Cited

U.S. PATENT DOCUMENTS

| 4,684,280 A | 8/1987 | Dirkin et al. | |
| 8,904,621 B2 * | 12/2014 | Patterson ................ | F16L 25/06 285/342 |
| 2008/0080946 A1 | 4/2008 | Grip | |

FOREIGN PATENT DOCUMENTS

| EP | 2441955 A1 * | 4/2012 | ........... E02B 17/027 |
| EP | 2884027 A1 * | 6/2015 | ............. E02D 27/42 |

(Continued)

OTHER PUBLICATIONS

International Search Report and Written Opinion for PCT/NL2021/050058 dated May 11, 2021 (12 pages).

*Primary Examiner* — Ryan D Kwiecinski
(74) *Attorney, Agent, or Firm* — KDW FIRM PLLC

(57) ABSTRACT

An assembly includes first and second tubular members of a wind turbine support structure. The second member has a fork-shaped cross section with a main body between two substantially parallel walls that each comprise at least one through hole, the first member is between the two walls of the second member, and the through holes of the first and second member define a channel. A connector insertable in the channel is consecutively radially expandable. An actuator is configured to move the connector in an axial direction in said channel. The connector, when expanded, pushes the first member in a radial direction relative to said channel against the second member to define a clamping contact and thereby a pre-tensioned connection in said radial direction between a face of the first member and a face of the main body of the second member. A method of assembling the assembly.

18 Claims, 13 Drawing Sheets

(56) References Cited

FOREIGN PATENT DOCUMENTS

| | | | | |
|---|---|---|---|---|
| EP | 2884027 | A1 | 6/2015 | |
| GB | 2468926 | A * | 9/2010 | ............ F16B 7/0493 |
| NL | 2020968 | B1 | 11/2019 | |
| NL | 2021462 | B1 | 2/2020 | |
| NL | 2024795 | B1 | 9/2021 | |
| WO | 2018139929 | A1 | 8/2018 | |
| WO | 2019056792 | A1 | 3/2019 | |

* cited by examiner

ASSEMBLY COMPRISING A FIRST AND A SECOND MEMBER AND A CONNECTOR, AND A METHOD OF ASSEMBLING SUCH AN ASSEMBLY

This application is a national stage filing under 35 U.S.C. 371 of International Application No. PCT/NL2021/050058, filed Jan. 29, 2021, which claims priority to Netherlands Patent Application No. 2024795, filed Jan. 30, 2020, the entirety of which applications are incorporated by reference herein.

The present invention relates to an assembly, comprising a first and a second member, and a connector to connect the first and second member relative to each other.

The invention further relates to a method of assembling such an assembly of a first and a second member that each comprise at least one through hole.

The present invention is particularly suitable for offshore applications, e.g. for connecting a wind turbine to a monopile, a wind turbine to a transition piece, a transition piece to a monopile, between members of a monopile or wind turbine, as well as to connections having a much smaller diameter than monopiles, e.g. between members of a jacket.

According to prior art applications in offshore, the members of such assemblies are provided with flanges which are connected using bolts of significant size. Currently M72 bolts are used for connecting a wind turbine tower to a monopile or transition piece. In a first step, these bolts are electrically tightened with 8.000 Nm. In a second step, the preload is increased with hydraulic tools to 22.000 Nm. The bolts itself are heavy and the tools for tightening the bolts are also heavy and hard to handle.

It appears that the actual preload on the bolts after some settling time is hard to predict and control, and may vary significantly. Although it is not exactly clear which factors influence the torque-tension relationship of the bolts, it may be concluded that installing the bolts using a "constant torque" method does not achieve satisfying results. Similar issues occur with tensioning systems for bolting. The preload on the bolts must be regularly checked and adjusted, periodically requiring significant maintenance work.

Furthermore, the bolts are arranged all around the circumference of the flanges, leaving only a very limited gap between adjacent bolts. A connection using flanges with bolts is insufficiently scalable to meet the ever increasing demands resulting from even larger wind turbines and greater depths at sea where they are installed.

International patent application WO 2018/139929 A1 of the same inventor proposes an assembly that is improved relative to a connection using flanges connected by bolts. This improved prior art assembly comprises:
- a first and a second section, each comprising a longitudinal axis;
- a fixation configured to fix the first and the second section;
- wherein at least one of the first and the second section comprises a body that is configured to be engaged by the fixation; and
- wherein the fixation comprises an abutment and a radially displaceable actuator. The actuator is radially displaceable with respect to the longitudinal axis of the section that comprises the actuator. This allows the actuator itself to be employed as part of a clamp. During radial displacement of the actuator, an inclined surface of the actuator engages a specially machined surface of the first section and gradually increases the clamping force that connects the first and the second section. Although the assembly of WO 2018/139929 A1 already provides a significant improvement relative to the above-described prior art connections using flanges connected by bolts, radial displacement of the actuator required a significant force due to the clamping action. Moreover, sections with a specially designed contact surface were required.

The inventor proposed even further improvements relative to the assembly of WO 2018/139929 A1 in the non pre-published international patent application PCT/IB2019/056792 that claims priority of the earlier Dutch national patent application NL2021462 dated 13 Aug. 2018. The improved assembly described in PCT/IB2019/056792 comprised:
- a first and a second member that are tubular members of a wind turbine support structure, wherein;
  - the second member has a fork-shaped cross section with a main body and two substantially parallel walls that each comprise at least one through hole;
  - the first member is arranged between the two walls of the second member, having the through hole;
- wherein a through hole of the first member and the through holes of the second member define a channel;
- further comprising a connector that is axially insertable in said channel to an end position and consecutively expandable radially relative to said channel, to connect the first and second member relative to each other; and
- wherein the connector, in an expanded state thereof, pushes the first member in a radial direction relative to said channel against the main body of the second member to define a pre-tensioned connection in said radial direction relative to said channel between the first member and the second member.

As a result of the pre-tensioned connection between the first member and the second member any load fluctuations going through the connector are reduced significantly resulting in very low fatigue damage levels compared to a non pre-tensioned connection.

Relative to the assembly of WO 2018/139929 A1, a human worker could insert a connector as described in PCT/IB2019/056792 into the channel to an end position in a first step, followed by a further step of consecutively expanding said connector radially relative to said channel, to thereby connect the first and second member relative to each other. In this way, the connector could be accurately and easily placed in the channel by a user with very limited hassle or force. Only when the connector is placed in its desired end position, it is expanded in the channel to connect the first and second member relative to each other. Use of a connector according to the invention also makes specially machined contact surfaces with an inclination corresponding to an inclination of the radially displaceable actuator redundant.

Relative to the older prior art of bolted flanges, large scale (e.g. M72) bolts are redundant. Also, the body could be less bulky than a flange comprising through holes to accommodate a bolt. As a result, the assembly according to the invention, required less material, was therefore more compact and lighter, and also more elegant. Whereas thick parts need to be forged, smaller parts may also be rolled, possibly allowing the members to be formed with alternative and more attractive manufacturing methods. The assembly described in PCT/IB2019/056792 was also scalable, providing the opportunity to arrange multiple connectors in axial direction of the members.

A further advantage of the assembly described in PCT/IB2019/056792 relative to bolted flanges, was the absence of these flanges that would provide a significant mass outside the path where forces travel during driving the assembly into a ground using a hammer. The mass of conventional flanges may result in bending of the neck of the flanges. These bending stresses currently result in significantly reduced life time of the welds of these flanges when installed with a conventional impact hammer.

An even further advantage of the proposed assembly relative to bolted flanges was that it could be applied for connecting members under the waterline. On the one hand, longitudinal members of a limited length could be used, allowing smaller ships to transport them to a desired location for an offshore construction.

The successively tightening the bolts of a bolted flange—which are typically tightened in multiple steps, as mentioned above—is very time consuming and labor-intensive. In PCT/IB2019/056792 the connectors were axially inserted in said channel by manual labor. A workman positioned each connector to the desired end position in said channel, before said connector was consecutively expanded radially relative to said channel, to connect the first and second member relative to each other and define a pre-tensioned connection there between.

The assembly described in PCT/IB2019/056792 was already less labor-intensive and time consuming than a connection having bolted flanges, but there remains a continuous need to further reduce manual labor and construction time.

A disadvantage of the assembly described in PCT/IB2019/056792 was that said assembly could only be applied in places where there was enough space for a human worker to work. Although such space is readily available inside a monopile, other types of foundations, e.g. between tubular members of jackets, may not offer sufficient space for a worker inside said tubular members. Consequently, the assembly described in PCT/IB2019/056792 could only be applied to small tubular members from the outside thereof inward. Moreover, a connection below the water line would require the human workers to be divers, significantly increasing construction time and human risks.

As will be clear from the description above, the assembly described in the non pre-published PCT/IB2019/056792 has many advantages that ideally should be maintained as much as possible. On the other hand, there remains an ongoing need for a further increase in efficiency and/or versatility.

The United States patent application US 2008/080946 A1 is directed to an expansion pin system for construction of a wind turbine structural tower, and is considered the closest prior art. Relative to US 2008/080946 A1, at least the characterizing features of the independent claims are novel. US 2008/080946 A1 discloses, in terminology of the present invention, a first and a second member, wherein the second member has a fork-shaped cross section with a main body and two substantially parallel walls that each comprise at least one through hole, wherein the first member is arranged between the two walls of the second member, having the through hole, and wherein said through hole of the first member and the through holes of the second member are aligned to define a channel. The expansion pin may be interpreted as a connector that is axially insertable in said channel to an end position and consecutively expandable radially relative to said channel, to connect the first and second member relative to each other. When the expansion pin system is inserted into the channel it results in an alignment of the through holes of the first and the second member.

The U.S. Pat. No. 4,684,280 discloses a configuration that shows some similarity to US 2008/080946 A1. In terminology of the present invention, it discloses a first and a second member, wherein the second member has a fork-shaped cross section with a main body and two substantially parallel walls that each comprise at least one through hole, wherein the first member is arranged between the two walls of the second member, having the through hole, and wherein said through hole of the first member and the through holes of the second member are aligned to define a channel. A clevis bushing may be interpreted as a connector that is axially insertable in said channel to an end position and consecutively expandable radially relative to said channel. This clevis bushing, upon radially expansion thereof, clamps itself in a through hole of one wall of the fork-shaped second member, and furthermore presses the first member in axial direction against the other wall of the fork-shaped second member.

The Dutch patent NL 2020968 by the same inventor and the European patent application EP 2 884 027 A1 are acknowledged as further prior art.

An object of the present invention is to provide an assembly, that is improved relative to the prior art. Said object is achieved with the assembly according to claim 1 of the present invention, comprising:
a first member and a second member that are tubular members of a wind turbine support structure, wherein; the second member has a fork-shaped cross section with a main body arranged between two substantially parallel walls that each comprise at least one through hole;
the first member is arranged between the two walls of the second member, having the through hole;
wherein a through hole of the first member and the through holes of the second member define a channel;
a connector that is axially insertable in said channel to an end position and consecutively expandable radially relative to said channel, to connect the first and second member relative to each other;
an actuator configured to move said connector in an axial direction in said channel; and
wherein the connector, in an expanded state thereof, pushes the first member in a radial direction relative to said channel against a face of the main body of the second member to define a clamping contact and thereby a pre-tensioned connection in said radial direction relative to said channel between a face of the first member and the face of the main body of the second member.

By using an actuator that is configured to move the connector in an axial direction relative to the channel, there is no need for a human worker to enter inside one of the respective first or second members, when the connectors are arranged from the inside, or to perform a hazardous diving operation when the connectors are arranged from the outside. The actuator, by virtue of replacing a human worker, allows for an increased level of automation and therefore a reduction in construction time. By automated insertion and expanding of the actuator, a controlled and repeatable force may be applied. Moreover, automated actuation also allows multiple connectors to be expanded simultaneously, thereby further reducing construction time and moreover allowing for an even application of a clamping contact that causes the pre-tensioned connection between the first member and the second member.

An even more important advantage is the increase in versatility. After all, the actuator allows the connector or connectors to be arranged in an assembly of first and second members that are too small for a human worker to fit in, especially if the connections are submerged and the human worker requires diving equipment. Such an assembly may be present in jacket construction, wherein tubular members may have diameters as small as 1 to 3 meter.

According to a preferred embodiment, the actuator is configured to consecutively:
  insert said connector into said channel from a first side;
  move said connector in the axial direction in said channel to the end position; and
  actuate the connector from the same first side to expand the connector radially relative to said channel and thereby connect the first and second member relative to each other. The actuator thus replaces a human worker and allows the connector to be inserted and expanded from a single, first side. This may be from an inside of the tubular member, but may also be from an outside of the tubular member. However, one side suffices, and consequently the channel formed by the through holes of the first and second members needs to be accessible from one side only.

According to a further preferred embodiment, the assembly further comprises a stop configured to set the end position of the connector relative to said channel. Said stop may comprise an abutment that is configured to abut against one of the first member and the second member, and may alternatively, or additionally, be defined by a maximum elongation or displacement of the actuator.

According to an even further preferred embodiment, the connector, in the expanded state thereof, pushes against faces of the through holes of the second member that are directed away from the main body thereof to define the pre-tensioned connection between the first member and the second member.

According to an even further preferred embodiment, in the expanded state of the connector, wherein the connection between the first member and the second member is pre-tensioned, the through hole of the first member is arranged at an offset relative to the through holes in the second member. As mentioned above, said through hole of the first member and the through holes of the second member define a channel, which means that said through holes are positioned in a way that they are "substantially" aligned. However, a presence of an offset may guarantee that there always remains a slight misalignment of the through hole of the first member relative to the through holes of the second member. This is advantageous, because the offset, i.e. the slight misalignment in the channel, guarantees that the connection between the first member and the second member may be optimally pre-tensioned. After all, the connector is configured to expand in the channel, wherein the connector pushes the first member against the main body of the second member. In order to optimally push the first member towards the main body of the second member, it is beneficial if the side of the connector that is directed towards the main body does not come into contact with the inner walls of the through holes in the parallel walls of the second member. In this way, the side of the connector that is directed towards the main body can fully transfer its compressive force to the first member that is pressed towards and against the main body of the second member to obtain the desired pre-tensioning.

According to a preferred embodiment, the connector comprises:
  a compacted state, wherein the connector has a size that is freely insertable into and out of the channel; and
  a connecting state, wherein the connector is expanded in the channel to connect the first and second member relative to each other.

In the compacted state, play between the connector and the inner wall of the channel allows the connector to be easily inserted into the channel. Afterwards, a high axial clamping force may be provided by the connector, which has the advantage that the assembly is less susceptible for load variations. This is best understood when compared to how a bolted joint carries a direct load. An adequately pretensioned bolt can survive in an application that an untightened, or loose bolt, would fail in a short period of time. The bolt only 'feels' a small portion of the applied load.

The invention is furthermore directed to a method of assembling a first and a second member that are tubular members of a wind turbine support structure and each comprise at least one through hole, wherein the second member has a fork-shaped cross section with a main body arranged between two substantially parallel walls that each comprise at least one through hole, said method comprising the steps of:
  arranging the first member between the two walls of the second member;
  positioning the through holes of the first and the second member to define a channel;
  inserting a connector into the channel to an end position;
  moving said connector in an axial direction in said channel by an actuator; and
  consecutively expanding said connector radially relative to said channel, to thereby connect the first and second member relative to each other, the expanded connector pushing the first member in a radial direction relative to said channel against a face of the main body of the second member to define a clamping contact and thereby a pre-tensioned connection in a radial direction relative to said channel between a face of the first member and the face of the main body of the second member.

According to a preferred embodiment, the step of inserting the connector into the channel to the end position comprises the steps of:
  the actuator inserting said connector into said channel from a first side; and
  the actuator moving said connector in the axial direction in said channel to the end position from said same first side.

The actuator thus replaces a human worker and allows the connector to be inserted and expanded from a single, first side. This may be from an inside of the tubular member, but may also be from an outside of the tubular member. However, one side suffices, and consequently the channel formed by the through holes of the first and second members needs to be accessible from one side only.

According to a further preferred embodiment, the step of consecutively expanding said connector radially relative to said channel comprises:
  the actuator actuating the connector from the same first side, thereby expanding the connector radially relative to said channel and connecting the first and second member relative to each other.

According to an even further preferred embodiment, the method further comprises the step of setting the end position of the connector relative to said channel by a stop.

According to an even further preferred embodiment, the step of moving said connector in the axial direction in said channel by the actuator is performed until the connector reaches its end position as defined by the stop, and the step of consecutively expanding said connector radially relative to said channel is performed upon further actuation of the actuator once the connecter has reached its end position.

Further preferred embodiments are the subject of the dependent claims.

In the following description preferred embodiments of the present invention are further elucidated with reference to the drawing, in which.

Figure 1:
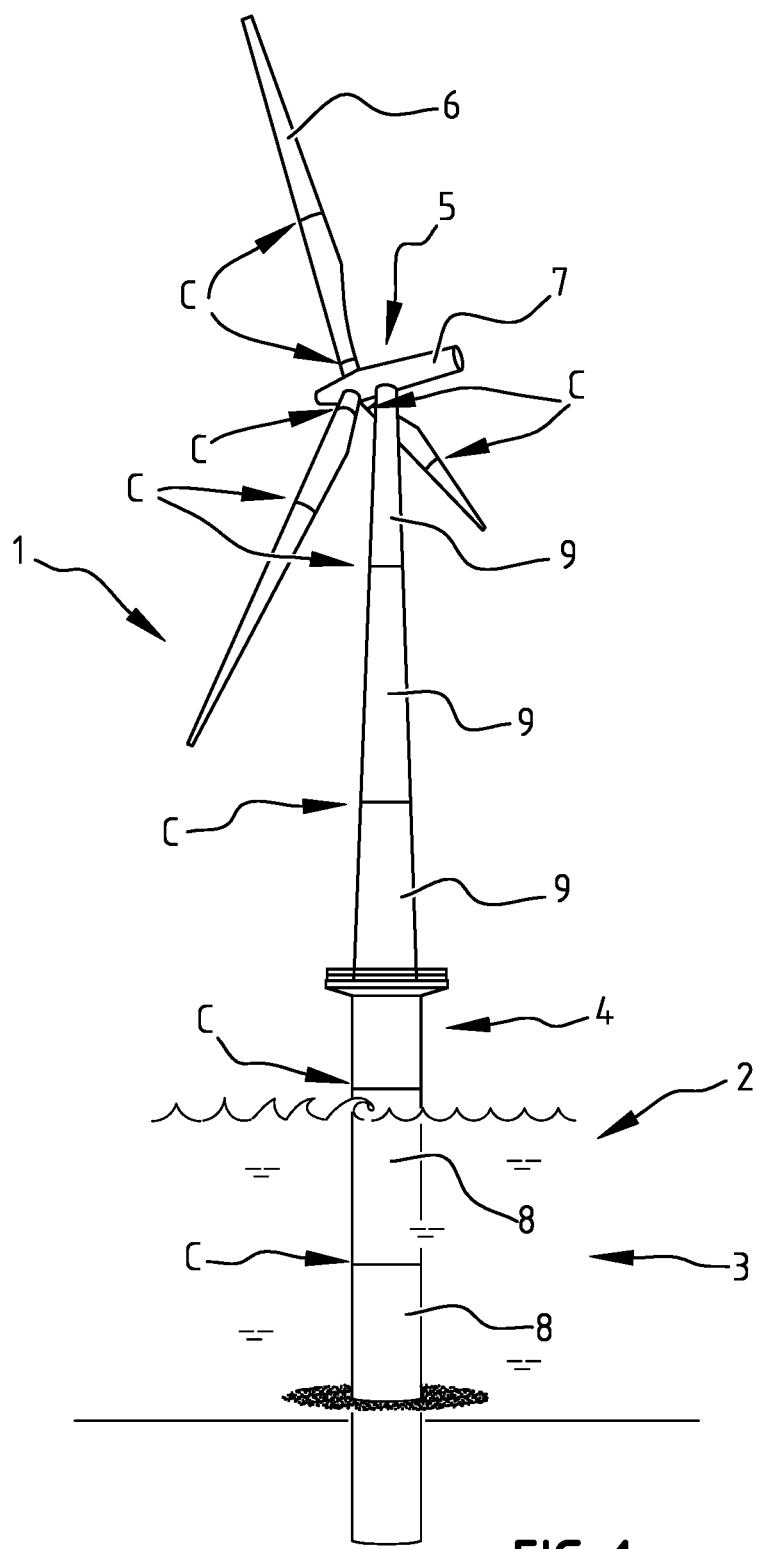
FIG. 1 is a schematic view of an offshore wind turbine tower supported by a monopile.
Figure 11:
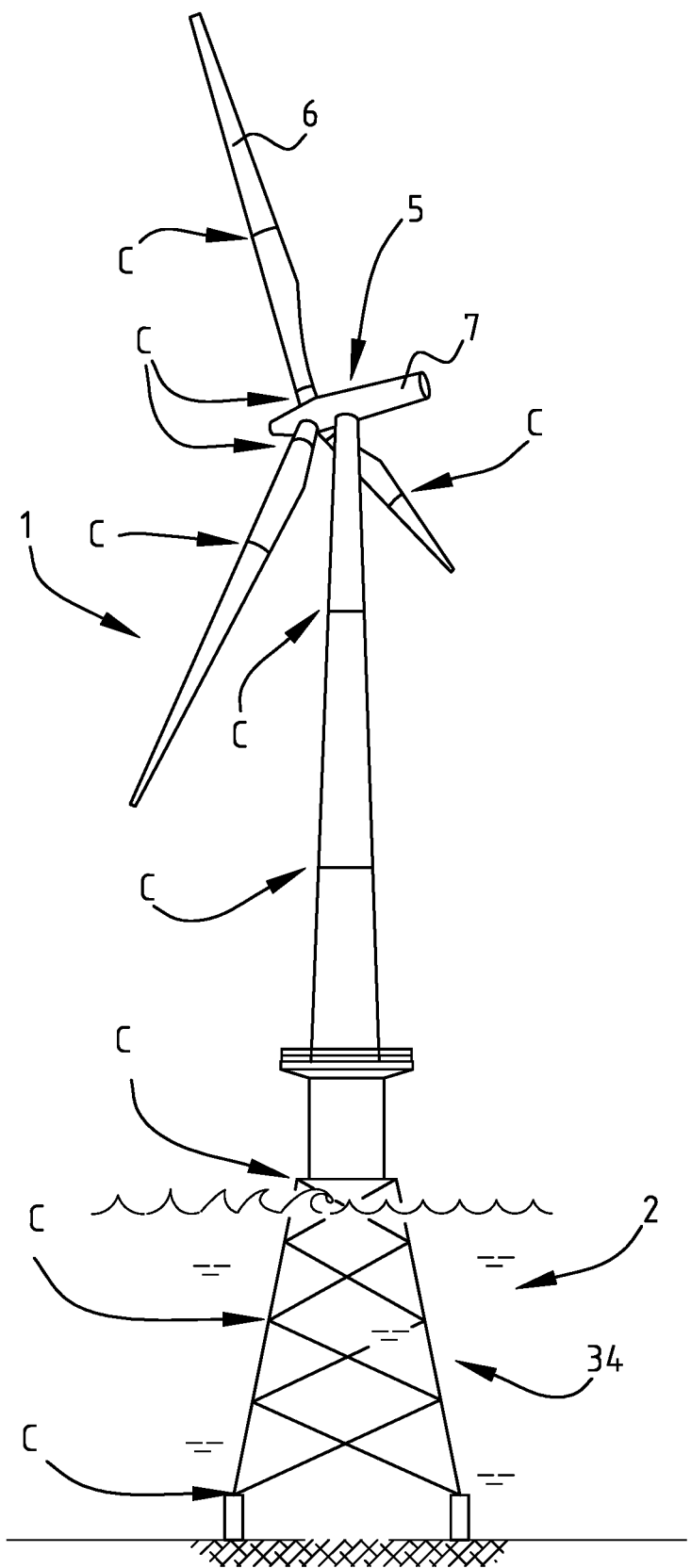
FIG. 11 is a schematic view of an offshore wind turbine tower supported by a jacket construction.

An example of an offshore construction comprising multiple connections C where an assembly according to the invention may be applied is shown in FIG. 1. An offshore wind turbine tower 1 is supported by a supporting base structure 2 which is in FIG. 1 embodied as a monopile 3 with a transition piece 4. The skilled person will understand that similar connections are present for alternative supporting base structures 2, such as in a jacket construction 34 as shown in FIG. 11.

The connections C may be applied between separate members 8 of the monopile 3, between the monopile 3 and the transition piece 4, between the transition piece 4 and the turbine tower 1, between members 9 of the turbine tower 1, and between a rotor blade 6 and a hub of a rotor, or even between different parts of a rotor blade 6. The construction proposed by the present invention does not require a human worker to enter a space inside a tubular member anymore, allowing the assembly to be applied for connecting (tubular) members of a relatively limited size, such as in jacket constructions. The connections C may serve to connect a jacket to a foundation, e.g. pre-piled foundation piles, drilled foundation piles or suction buckets. It may also be used to provide a jacket to jacket connection.

During use, a wind turbine 5 will be oriented such that the rotor blades 6 are optimally driven by the available wind power. The rotor blades 6 drive a (not shown) generator in the nacelle 7, wherein the generator generates electricity. The wind turbine 5 causes alternating loads on any connection C in the construction, and dependent on the wind direction, specific parts of the connection C have to absorb most of the loads.

The assembly according to the invention comprises the first member 10 and a second member 11, wherein the second member 11 has a fork-shaped cross section 15 with a main body 16 arranged between two substantially parallel walls 17 that each comprise at least one through hole 12, 13, 14. The first member 10 is arranged between the two walls 17 of the second member 11, having the through hole 13, 14. Said through hole 12 of the first member 10 and the through holes 13, 14 of the second member 11 define a channel 18.

The assembly further comprises a connector 19 that is axially insertable in said channel 18 to an end position (FIGS. 3B and 7) and consecutively expandable radially relative to said channel 18 (FIG. 8), to connect the first member 10 and the second member 11 relative to each other. The connector 19 comprises a compacted state (shown in FIGS. 3A, 3B, 5-7 and 12), wherein the connector 19 has a size that is freely insertable into and out of the channel 18, and a connecting state (e.g. shown in FIGS. 8 and 9) wherein the connector 19 is expanded in the channel 18 to connect the first 10 and second member 11 relative to each other.

An actuator 20 is configured to move said connector 19 in an axial direction in said channel 18. The connector 19, in an expanded state thereof (FIGS. 8 and 9), pushes the first member 10 against a face 27 of the main body 16 of the second member 11 to define a clamping contact and thereby a pre-tensioned connection between a face 28 of the first member 10 and the face 27 of the main body 16 of the second member 11.

The assembly according to the present invention comprises a first member 10 and a second member 11, each comprising at least one through hole 12-14. The through holes 12-14 may be directly arranged in the first member 10 and the second member 11, and consequently prior art flanges are redundant. This has several advantages, one of them being a saving of material and less weight outside the line of travel of forces through the assembly.

By using an actuator 20 that is configured to move the connector 19 in an axial direction relative to the channel 18, there is no need for a human worker to enter inside one of the respective first or second members 10, 11. The actuator 20, by virtue of replacing a human worker, allows for an increased level of automation and therefore a reduction in construction time. By automated insertion and expanding of the actuator 20, a controlled and repeatable force may be applied. Moreover, automated actuation also allows multiple connectors 19 to be expanded simultaneously, thereby further reducing construction time and moreover allowing for a uniform application of a clamping contact that causes the pre-tensioned connection between the first member 10 and the second member 11.

An even more important advantage is the increase in versatility. After all, the actuator 20 allows the connector 19 to be arranged in an assembly of first and second members 10, 11 that are too small for a human worker to fit in. Such an assembly may be present in jacket construction, wherein tubular members may have diameters as small as 1 to 3 meter, and may be impossible to access, either because of their limited size, or e.g. for safety reasons or because they are submerged. Especially under water, human workers would have to carry diving equipment, requiring additional space that is not present in tubular members with such small diameters.

A taper angle at the top of first member 10 allows for a certain amount of ovality in either member 10 or 11 to be forced back into a round shape under the force of gravity by pushing first member 10 into second member 11. Although not shown, a similar taper shape may be present at the ends of one or both of the walls 17 of the fork-shaped cross section 15 of the second member 11.

The assembly shown in the Figures further comprises a stop 21 configured to set the end position of the connector 19 relative to said channel 18. The stop 21 may comprise an abutment 22 that is configured to abut against one of the first member 10 and the second member 11. Alternatively, the stop 21 may be defined by a maximum elongation or displacement of the actuator 20.

Figure 2:
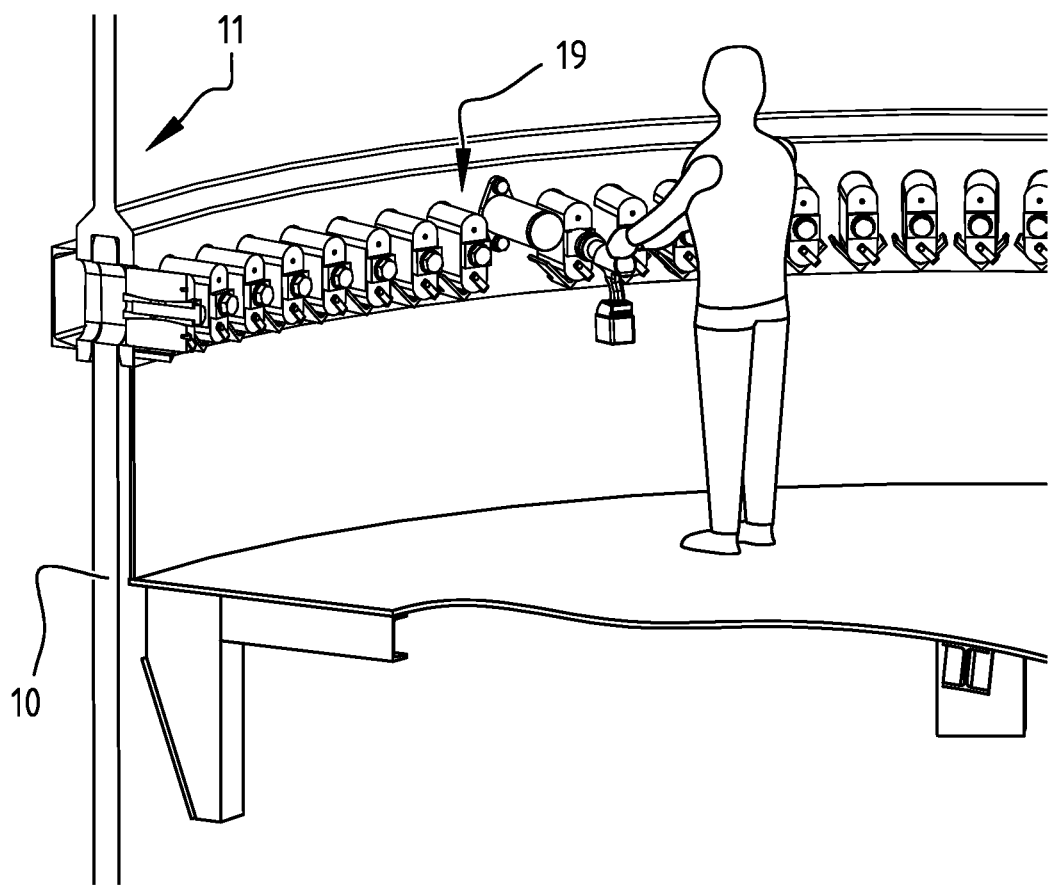
FIG. 2 is a perspective view inside a monopile of a wind turbine according to non pre-published patent application PCT/IB2019/056792.
Figure 3A:
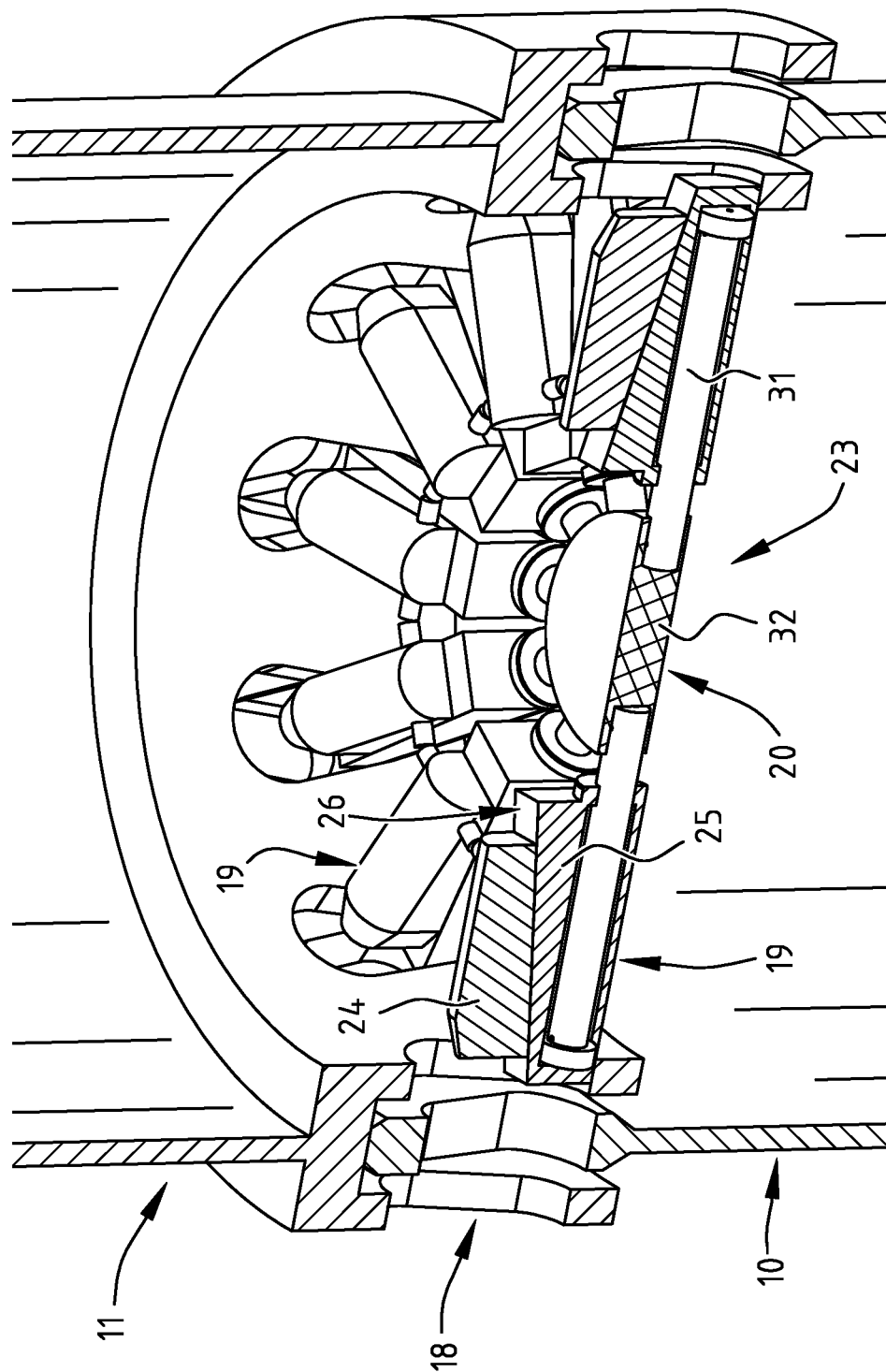
FIG. 3A is a perspective view inside tubular members of limited diameter, e.g. of a jacket construction, wherein the connectors are each positioned in front of an associated channel.
Figure 3B:
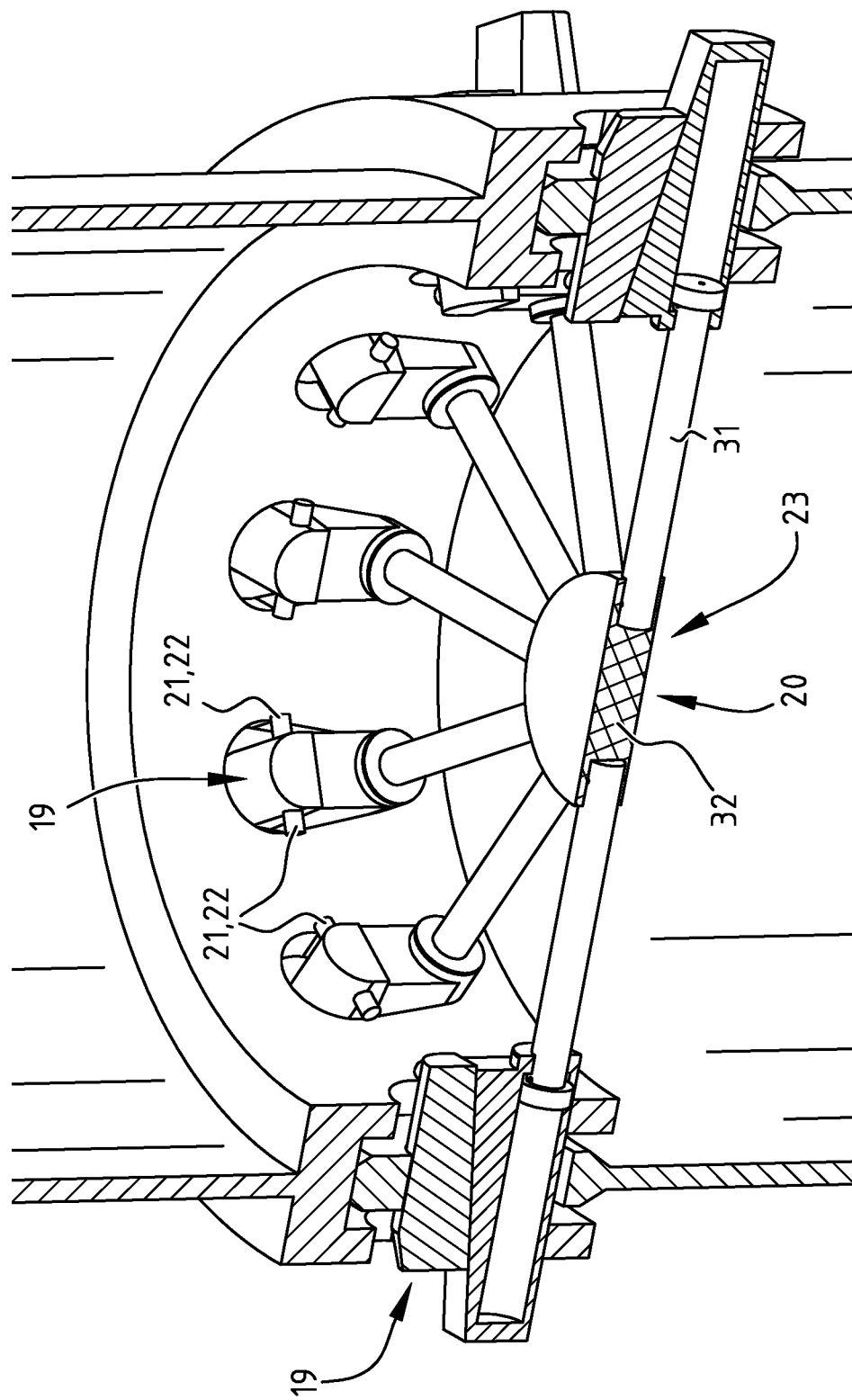
FIG. 3B is a perspective view according to FIG. 3A, wherein the connectors are each positioned in an end position in their associated channels.

In FIG. 3, a clamping device 23 is arranged inside first and second members 10, 11 having a tubular shape and a significantly smaller diameter than the monopile shown in FIG. 2. In fact, the limited diameter of the tubular first and second members 10, 11 shown in FIGS. 3A and 3B may be in the order of 1-3 meter, i.e. too small for a human worker to enter and work in. The first and second members 10, 11 shown in FIGS. 3A, 3B and 4-8 may be part of a jacket construction. In FIG. 3A, the connectors 19 are each positioned in front of an associated channel 18. FIG. 3B shows that the connectors 19 are each moved by the actuator 20 inside their associated channels 18, wherein the connectors 19 are each positioned in an end position in their associated channels as defined by the stop 21. The stop 21 is here embodied as an abutment 22 abutting against an inner one of walls 17 of the second member 11.

The connector 19 comprises at least one expansion block 24 and at least one wedge 25, wherein the actuator 20 is configured to displace the wedge 25 relative to the expansion block 24. The wedge 25 has an inclined surface 26 facing the at least one expansion block 24.

If the stop 21 is arranged on the at least one expansion block 24, it may prevent the expansion block to be inserted fully inside the channel 18. The stop 21, which may be embodied as abutment 22, may thus define an end position of the connector 19 relative to said channel 18 (FIG. 3B).

Figure 4:
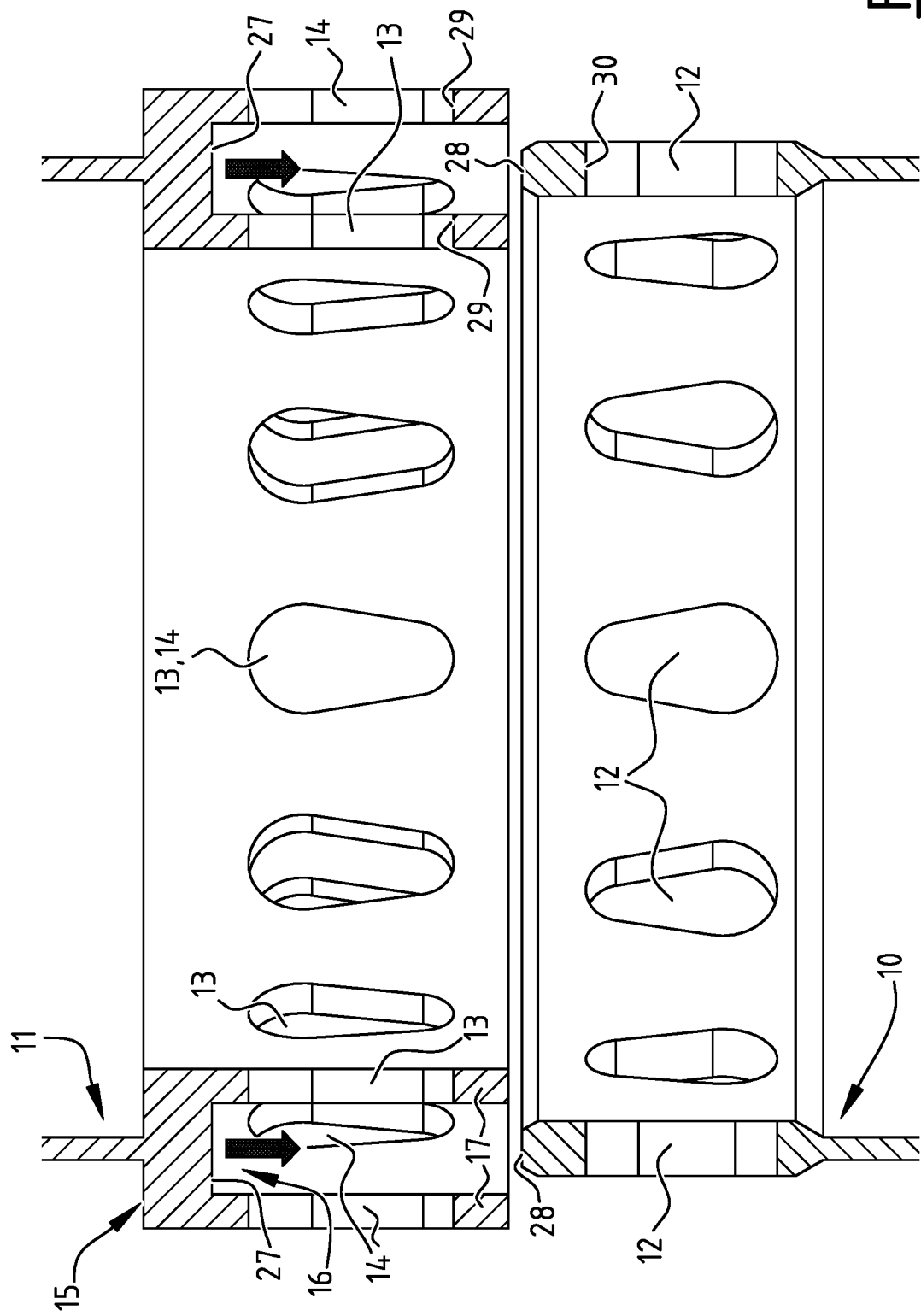
FIGS. 4-8 are cross sectional side views of successive steps of assembling the assembly according to the invention.
Figure 5:
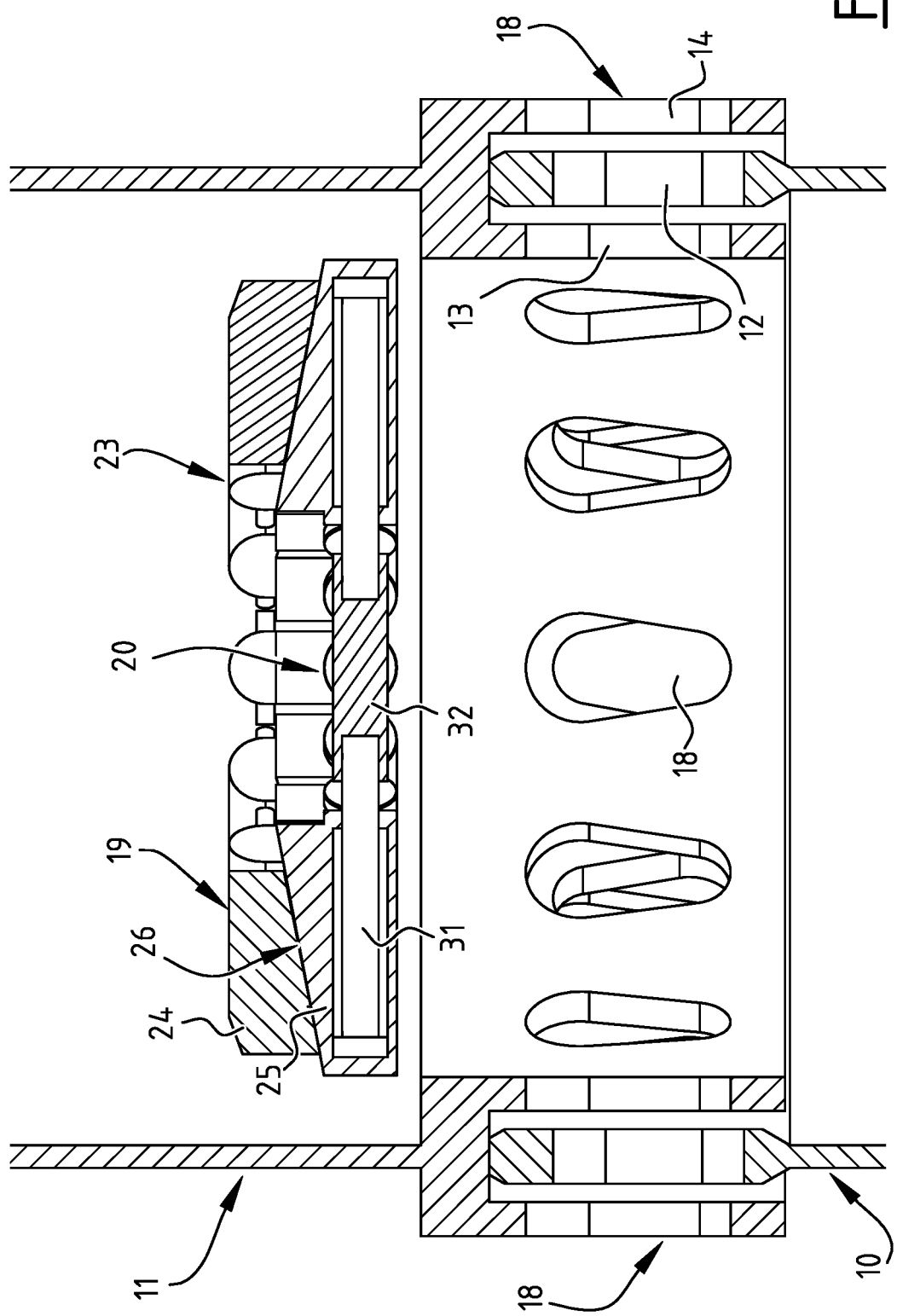
Figure 6:
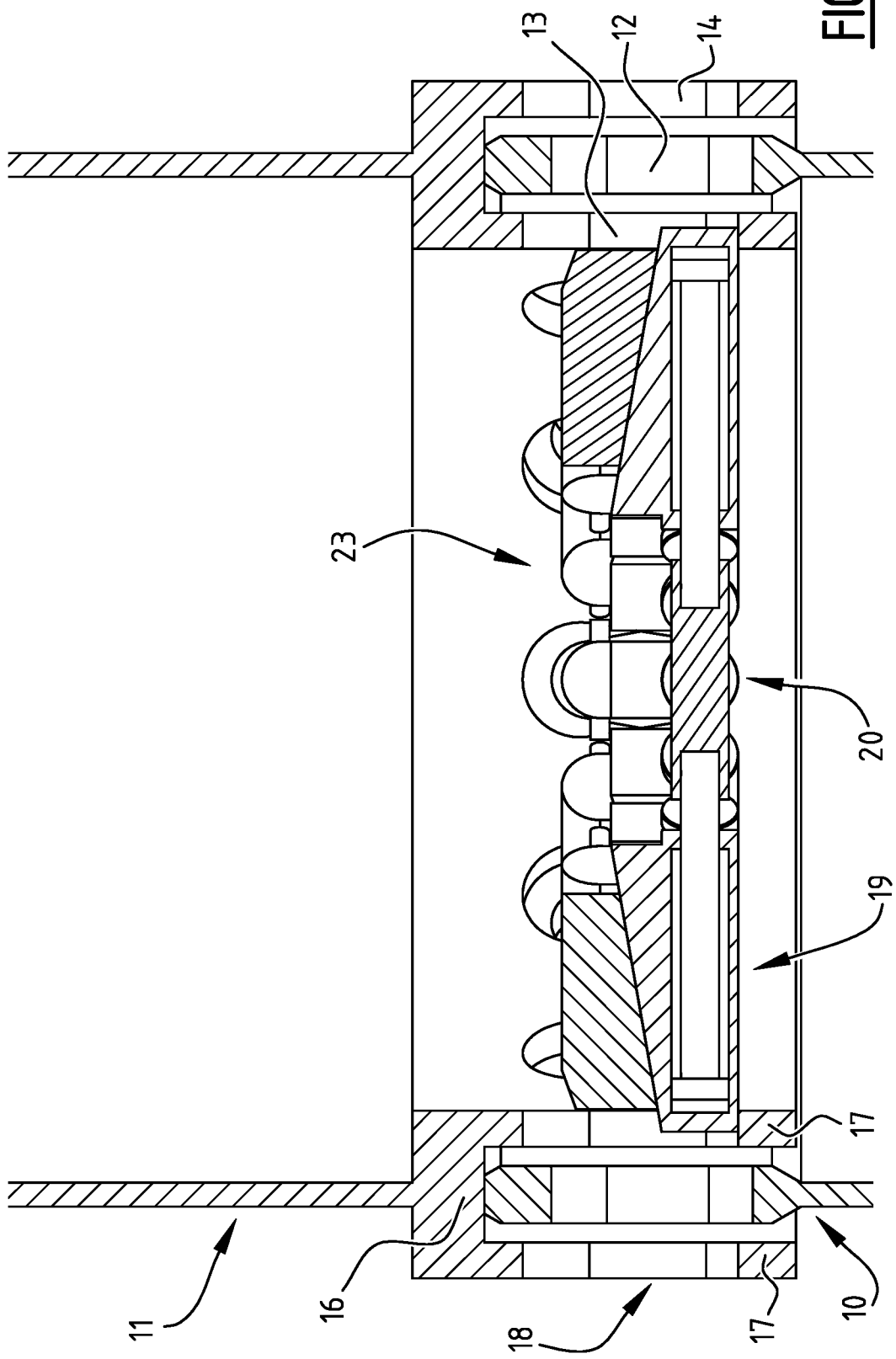
Figure 7:
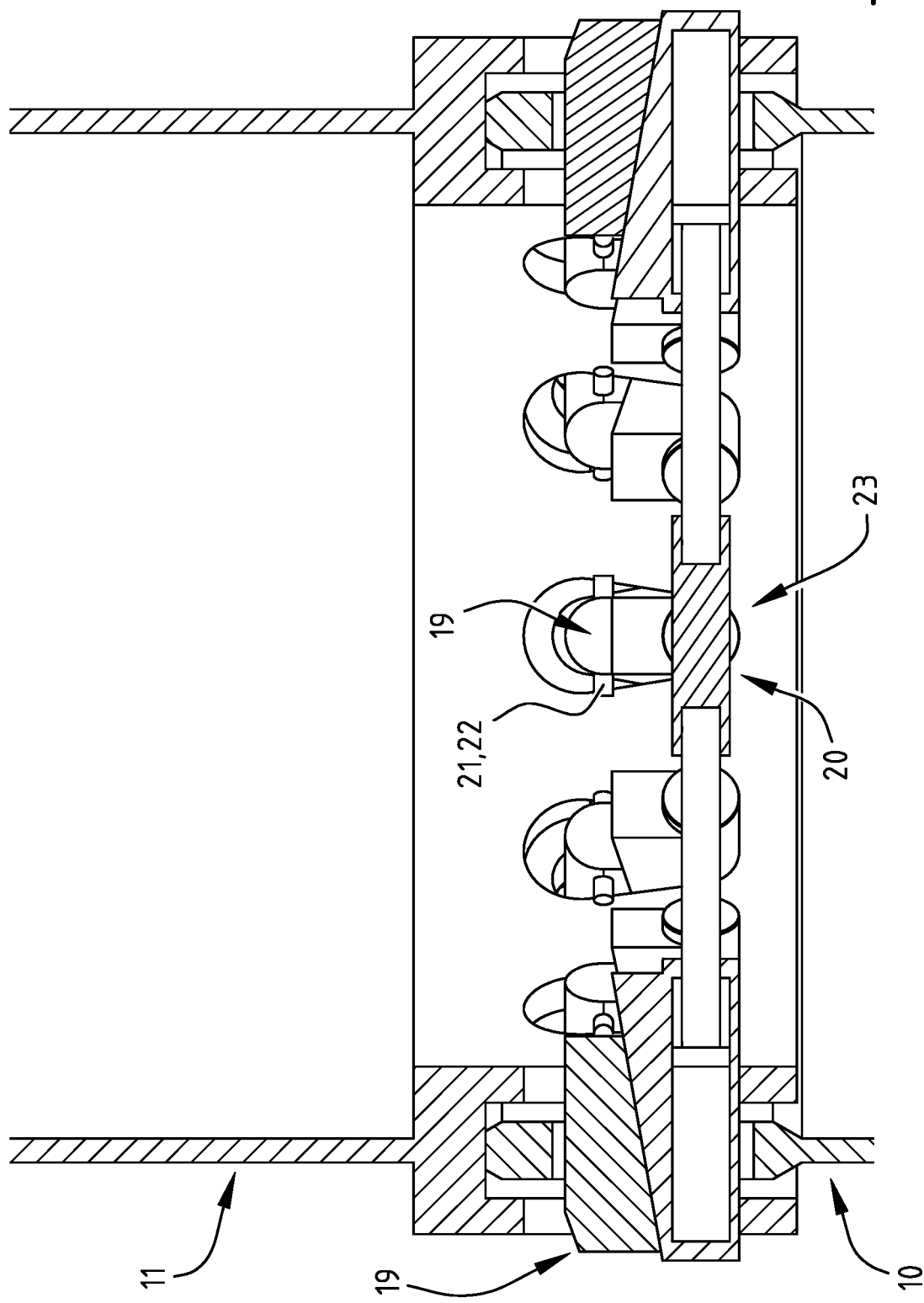

Successive steps of assembling the assembly according to the invention are now further elucidated on the basis of FIGS. 4-8. It is repeated that the first and the second member 10, 11 each comprise at least one through hole 12, 13, 14, wherein the second member 11 has a fork-shaped cross section 15 with a main body 16 arranged between two substantially parallel walls 17 that each comprise at least one through hole 13, 14. The method of assembling starts with the step of arranging the first member 10 between the two walls 17 of the second member 11 (FIG. 4). The next step is positioning the through holes 12, 13, 14 of the first member 10 and the second member 11 to define a channel 18 (FIG. 5). FIG. 5 also shows that a clamping device 23 is inserted inside the second member 11 and brought to a position wherein the connectors 19 of said clamping device 23 substantially align with associated channels 18 (FIG. 6). The next step comprises the step of inserting a connector 19 into the channel 18 to an end position (FIG. 7), which is performed by moving said connector 19 in an axial direction in said channel 18 by the actuator 20 (FIG. 7). Consecutively, said connector 19 is expanded radially relative to said channel 18, to thereby connect the first member 10 and the second member 11 relative to each other, the expanded connector 19 pushing the first member 10 against a face 27 of the main body 16 of the second member 11 to define a clamping contact and thereby a pre-tensioned connection between a face 28 of the first member 10 and the face 27 of the main body 16 of the second member 11.

Figure 8:
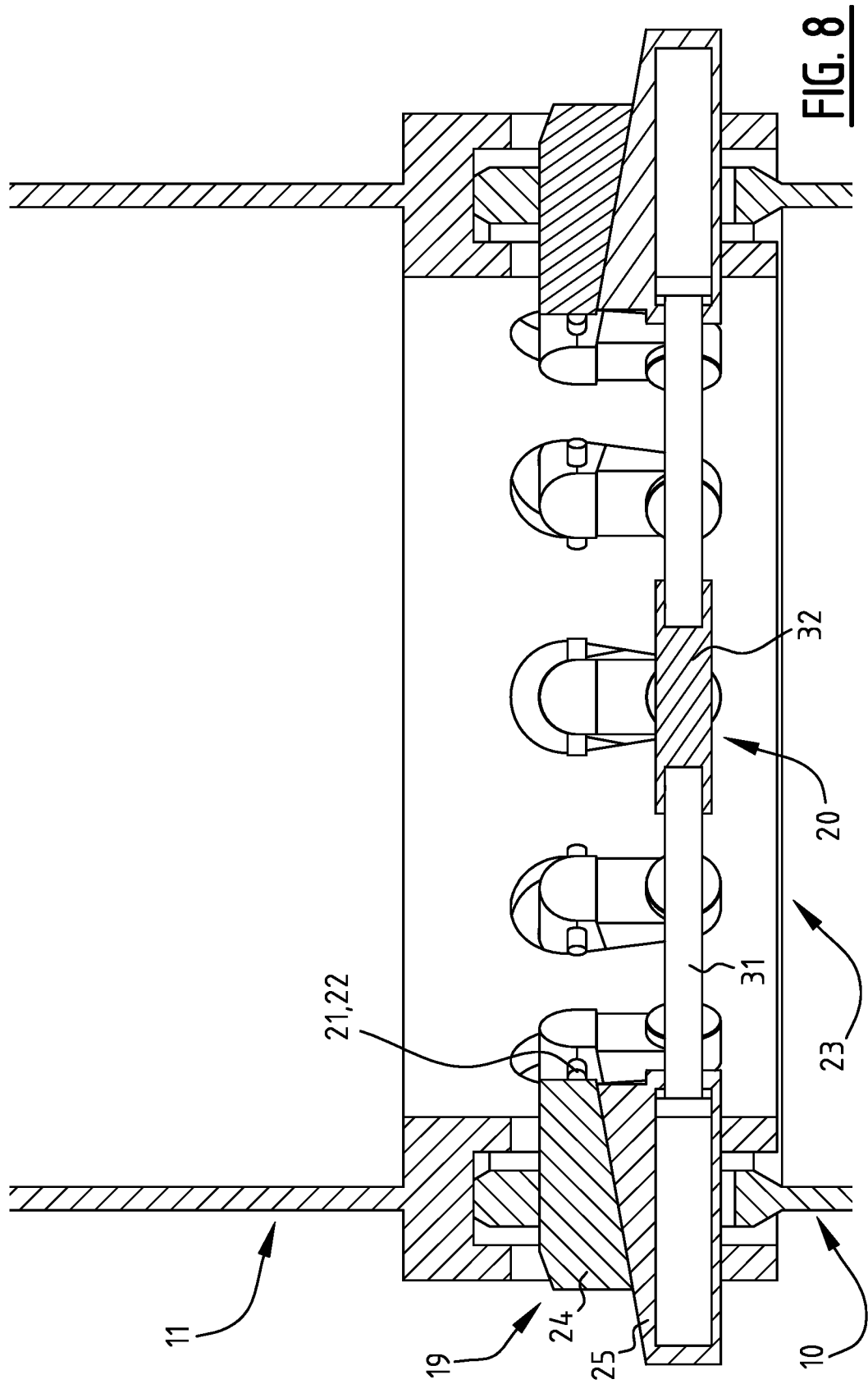

FIG. 7 shows the step of setting the end position of the connector 19 relative to said channel 18 by the stop 21. The stop 21, which is embodied as an abutment 22, abuts against an inner one of the walls 17 of the fork-shaped second member 11, thereby preventing the expansion block 24 to move further inside said channel 18. The step of moving said connector 19 in the axial direction in said channel 18 by the actuator 20 is performed until the connector 19 reaches its end position as defined by the stop (FIG. 7). The step of consecutively expanding said connector 19 radially relative to said channel 18 is performed upon further actuation of the actuator 20 once the connecter 19 has reached its end position. FIG. 8 shows how the expansion block 24 is stopped by the stop 21, while the wedge 25 is pushed further relative to said channel 18 by the actuator 20. Due to the inclined surface 26 of the wedge 25, the expansion block 24 is moved in a radial direction relative to said channel 18 until the clamping contact and thereby the pre-tensioned connection between the face 28 of the first member 10 and the face 27 of the main body 16 of the second member 11 is obtained.

Figure 9:
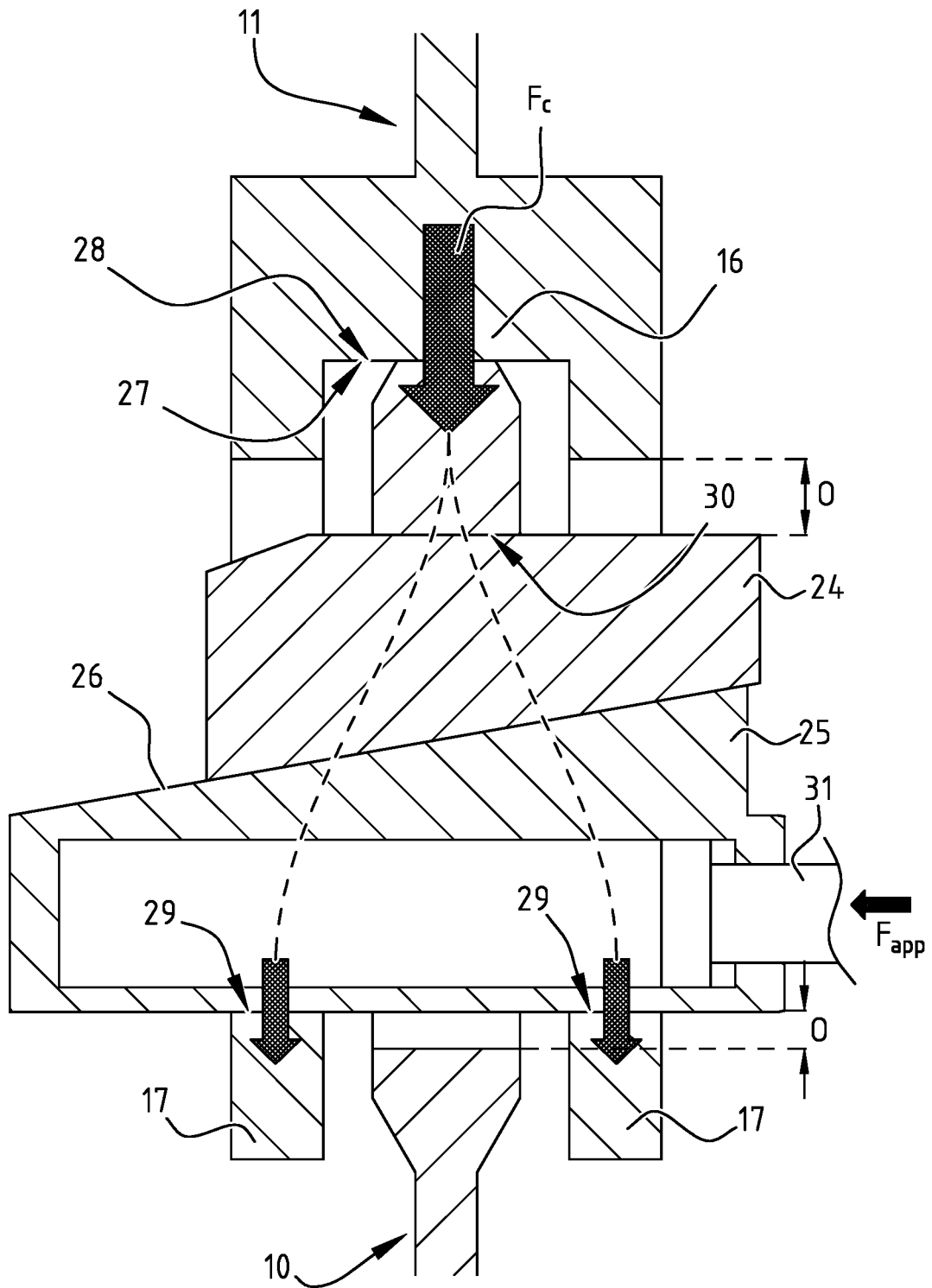
FIG. 9 is a cross sectional side view of showing a load transfer path through the assembly when the first and the second member are in a pre-tensioned connection.

The clamping contact and resulting pre-tensioned connection between the first member 10 and the second member 11 is now further explained by FIG. 9. It is explicitly mentioned that this explanation relates to the orientation shown in FIG. 9, but the skilled person will understand the same principle may also be applied in other orientations, such as transverse or upside down relative to FIG. 9. In the connecting state shown in FIG. 9, the connector 19 contacts at its lower side with faces 29 formed at the lower side of the respective through holes 13, 14 of the second member 11. The upper side of the connector 19 contacts a face 30 that is arranged at the upper side of the through hole 12 in the first member 10. In the expanded state of the connector 19, the connector 19 pushes faces 29 of the second member 11 away from face 30 of the first member 10. Consequently, the second member 11 is pushed downward relative to the first member 10, and a clamping contact is formed between a face 28 defined by the upper side of the first member 10, and a face 27 defined by the main body 16 of the second member 11. Thus, by expanding the connector 19, a pre-tensioned connection between the first 10 and the second member 11 can be formed. The faces 27, 28, 29 and 30 can be best seen in FIG. 4. By having sufficient pretension, the load fluctuations going through the connector 19 are reduced significantly resulting in very low fatigue levels.

The connector 19, in the expanded state thereof, pushes against faces 29 of the through holes 13, 14 of the second member 11 that are directed away from the main body 16 thereof to define the pre-tensioned connection between the first member 10 and the second member 11. In the expanded state of the connector 19, wherein the connection between the first member 10 and the second member 11 is pre-tensioned, the through hole 12 of the first member 10 is arranged at an offset O or offsets O, relative to the through holes 13, 14 in the second member 11.

The assembly may comprise one or more than one further connector 19, wherein the actuator 20 is arranged between the connector 19 and the one or more than one further connector 19, wherein each of the connector 19 and the one or more than one further connector 19 is inserted into its own channel 18. The preferred embodiment shown in the Figures comprises a total of twelve connectors 19, of which five are shown in full and two are shown intersected. Multiple channels 18 and associated connectors 19 are arranged along a circumference of the first 10 and the second member 11.

The actuator 20 is preferably configured to simultaneously move said connector 19 and at least one or more than one further connector 19 in an axial direction of their associated channels 18. Automated actuation using actuator 20 also allows multiple connectors 29 to be expanded simultaneously, thereby further reducing construction time and moreover allowing for a uniform application of a clamping contact that causes the pre-tensioned connection between the first member 10 and the second member 11.

The actuator 20 may be arranged in a clamping device 23. The actuator 20 may comprise one or more than one hydraulic cylinder 31. The shown embodiment comprises twelve hydraulic cylinders 31, i.e. one for each connector 19. A common pressure supply 32 may be configured to move said hydraulic cylinders 31 simultaneously.

The expansion block 24 has a surface 33 of which at least a portion is a contact surface with the wedge 25 having an orientation corresponding with the inclined surface 26 of said wedge 25. When the orientation of the contact surface of the clamping block 24 and the inclined surface 26 of the wedge 25 are substantially equal, a reliable mating interface is obtained. The inclined surface 26 of said wedge 25 may comprises an inclination with an angle of less than 15° relative to a displacement direction of said wedge 25. By providing an inclination with a relatively flat angle, an axial clamping force $F_c$ results after decomposition thereof in only a very limited radial force component. The relatively small value of the radial force component is typically less than the friction at the contact surface between wedge 25 and clamping block 24, resulting in a self-locking contact between the wedge 25 and the clamping block 24 in the connecting state. As a result, the wedge 25 remains in place even if the actuator 20 for originally displacing the wedge 25 would be loosened or even removed. In this way, a reliable and fail-safe assembly is provided.

In the shown embodiments the first member 10 and the second member 11 are overlapping tubular members and the through holes 12, 13, 14 are radially aligned relative to the tubular members to define the channel 18 that is radially extending. Said channel 18 may have an elongate cross section extending in a longitudinal direction of at least one of said first member 10 and said second member 11. The first member 10 and the second member 11 may have longitudinal axes that are at least parallel, and that preferably coincide.

A symmetrical force transmission may be obtained if, according to the shown preferred embodiment, the second member 11 has a fork-shaped cross section 15 with a main body 16 and two substantially parallel walls 17 that each comprises at least one through hole. In this embodiment, the first member 18 is arranged between the two walls 17 of the second member 11, having the through holes 13, 14, and said through hole 12 of the first member 10 and the through holes 13, 14 of the second member 11 are positioned to define the channel 18. The arrows in FIG. 9 indicate how a clamping force $F_c$ is symmetrically distributed.

In order to elucidate the forces in the assembly, the axial clamping force $F_c$ is interpreted as a value 100%, directed in the axial direction of the assembly, i.e. in the axial direction of the first member 10 and the second member 11. The distributed clamping forces $F_{cd}$ in each wall 17 of the fork-shaped cross section 15 of the second member 11 will have a value $F_{cd}=100/2=50\%$.

When the actuator 20 moves the wedge 25 of a single connector 19 in an axial direction of the channel 18, i.e. in the radial direction of the assembly of the first member 10 and the second member 11, a required actuation force $F_a$ of tens to several hundreds of tons is needed. This force that is in the axial direction of the channel 23 will be used to overcome the friction force in interfaces 29 and 26 and to generate a clamping force $F_c$. The friction forces are typically between 5-20% of their load perpendicular to the friction plane (friction coefficient of 0.05-0.2). With an assumed friction coefficient of 10% at both surfaces 29 and 26, the horizontal actuating force required to overcome this friction force is 20% of the preload $F_{cd}$. Additionally the inclined plane will result in a force amplification of the load $F_{app}$ that is applied in the axial direction of the channel. This causes the clamping force $F_c$. For a single wedge (unlike the system in application . . . where double wedges are used) this results in a roughly double as high preload ($F_c$) than was applied in axial direction of the channel. If the axial force applied on wedge 25 would be 100 tons than the preload $F_c$ (with a typical inclination between wedges 24 and 25 of 11 degrees) would be 250 tons. This 100 ton horizontal force needs to overcome the friction on the interfaces 29 and 26 (0.1*2*200)=40 tons and the remaining force would be used to generate the preload through the inclined plane. In the configuration described above, the force levering ratio is 2.5 (250 $F_c$ versus 100 applied $F_{app}$) for a single wedge. This ratio can increase further with smaller wedge angles and lower friction coefficients.

In order to generate the 100 ton horizontal load ($F_{app}$) in the direction of the channel 18 an equal reaction force needs to be applied on a wall 17. If the connectors 19 are applied from the inside of the first and second members 10, 11 as shown in FIGS. 3A, 3B, 4-8 and 12, the inner wall 17 of the fork-shaped cross section 15 of the second member 11 will be subjected to a large bending load. By applying opposing pairs of connectors 19 simultaneously, such reaction forces would cancel each other out.

The channel 18 preferably has an elongate cross section extending in a longitudinal direction of at least one of said first 10 and said second member 11. Relative to channels having a circular shape, such an elongate cross sectional shape provides a relatively large amount of material between successive channels 18 if multiple channels 18 and connectors 19 are arranged along a circumference of the first 10 and the second member 11.

Although shown as an integral part in FIGS. 2-9 and 12, the fork-shape of the second member 11 may comprise an assembly of a (tubular) main body 16 and the two substantially parallel walls 17 connected thereto. The parallel walls 17 itself may each comprise a plurality of plates 35 arranged along the circumference of the main body 16. Said plates 35 may be attached to the main body 16 with a bolted connection 36 (FIG. 10).

Figure 10:
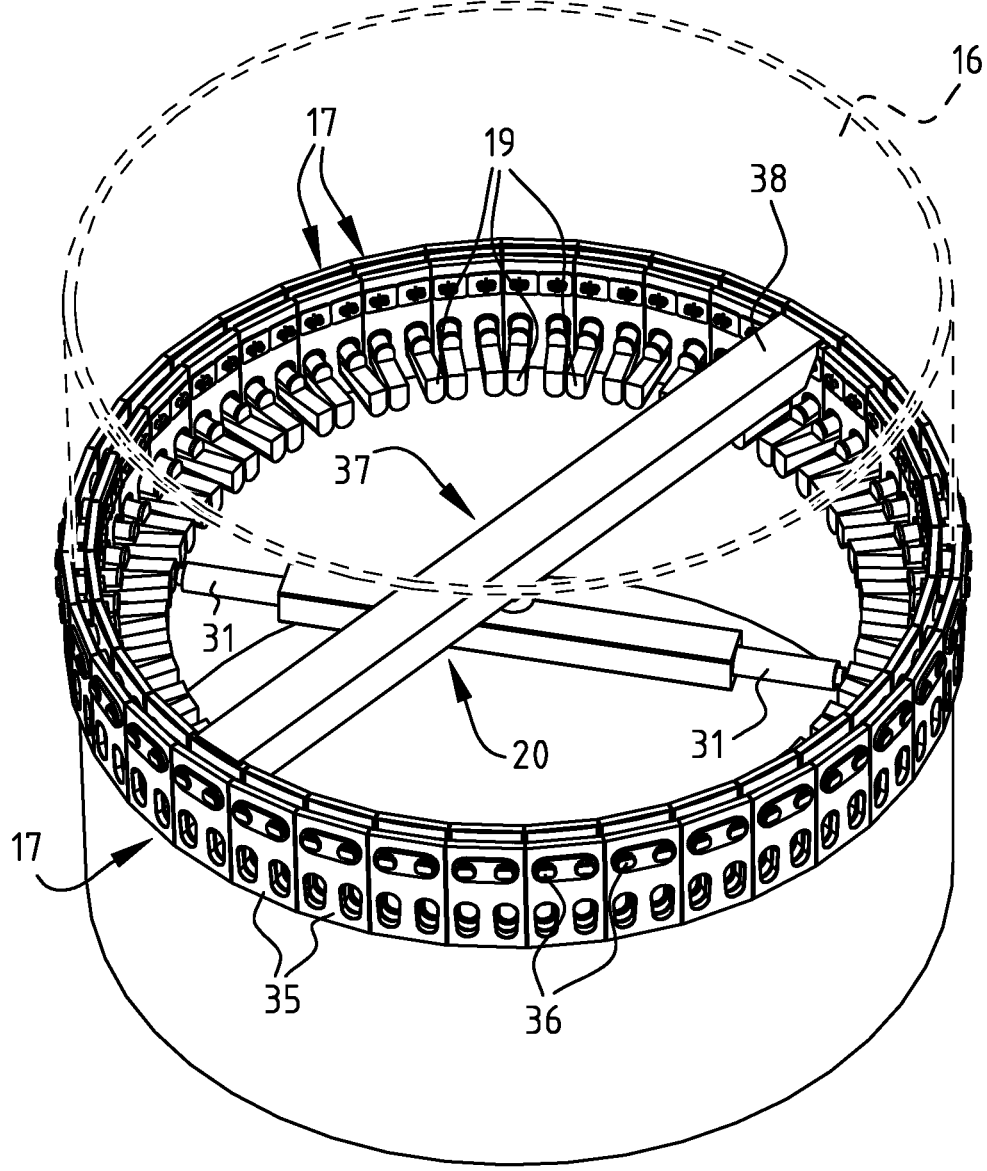
FIG. 10 is a perspective view of an assembly and a fastening device.

FIG. 10 shows an embodiment wherein the actuator 20 is arranged in a fastening device 37 that comprises a support 38. This support 38 may be configured to be supported on an inner one of the walls 17. The actuator 20 may be rotatably arranged relative to the support 38 to allow the actuator to successively engage a specific connector 19 or connectors 19. Preferably, the actuator 20 is configured to simultaneously move said connector 19 and at least one or more than one further connector 19 in an axial direction of their associated channels 18. In FIG. 10, two connectors 19, that are arranged opposite relative to each other, are actuated simultaneously. In this way, reaction forces may cancel each other out. In this respect it is remarked that a cancelling out of reaction forces may also be obtained with other configurations, such as with a triangular configuration of three hydraulic cylinders 31 that are oriented at 120° relative to each other. A square configuration may comprise four hydraulic cylinders 31 that are oriented at 90° relative to each other, etcetera.

Figure 12:
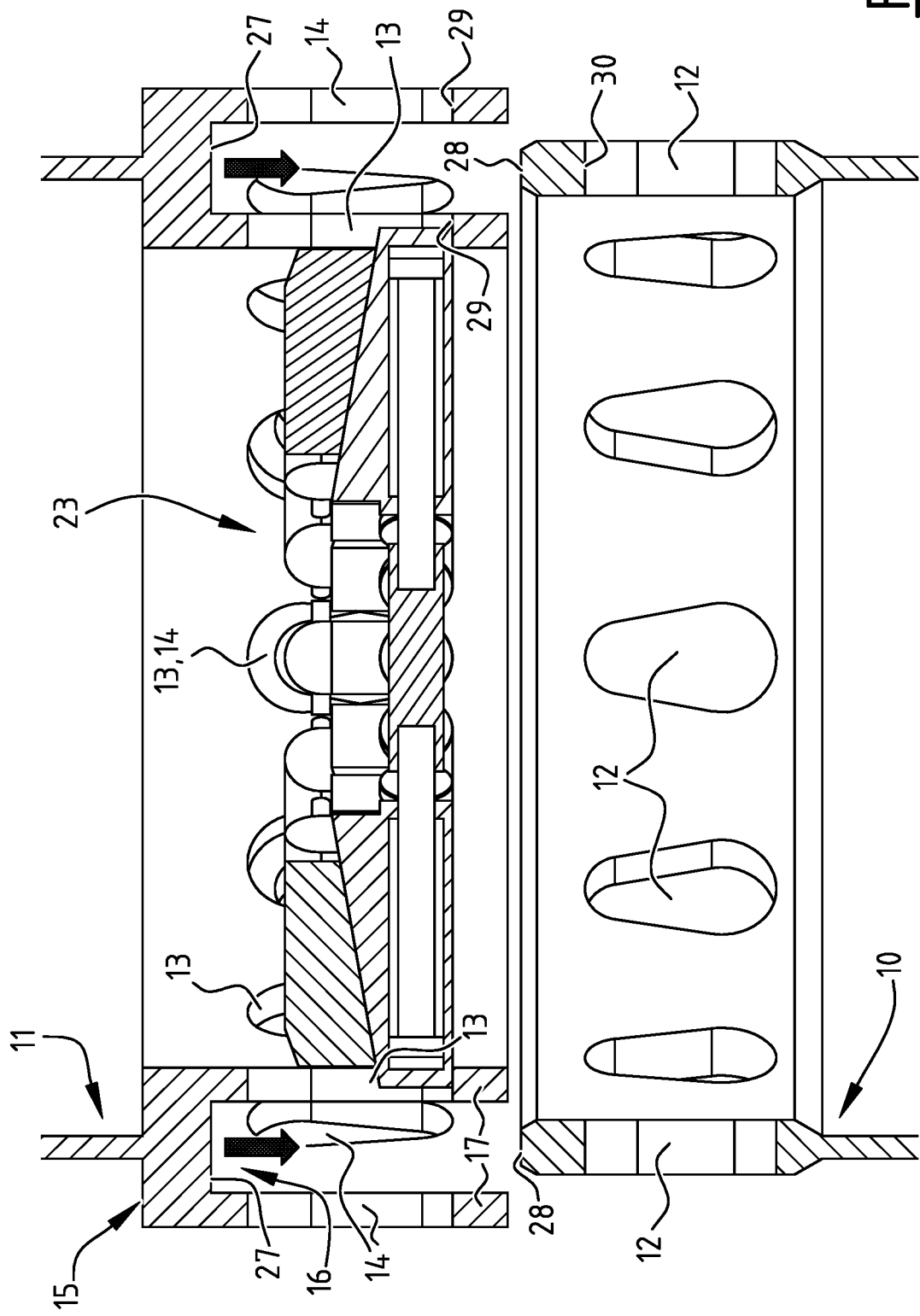
FIG. 12 is a cross sectional side view according to an alternative embodiment.

In the alternative and more preferred embodiment shown in FIG. 12, the clamping device 23 is arranged inside the second member 11. By arranging the clamping device 23 inside the second member 11, a correct positioning of the connectors 19 relative to the through holes 13, 14 of the second member is guaranteed. Consequently, the connectors 19 of said clamping device 23 are not only in alignment with the through holes 13, 14 of the second member, but they are also in alignment with the associated channels 18. In this way, the connectors 19 may be easily positioned, also in under water conditions.

Although they show preferred embodiments of the invention, the above described embodiments are intended only to illustrate the invention and not to limit in any way the scope of the invention. FIG. 1 shows an offshore wind turbine tower construction and FIGS. 3A, 3B, 4-8 show tubular members of a limited diameter as e.g. applied for jackets. The first and the second member may be members of an offshore construction, preferably of an offshore wind turbine construction or a jacket construction. Each of the first 10 and the second member 11 are preferably tubular members of a monopile or a jacket construction. Alternatively, one of the first 10 and the second member 11 may be a rotor blade of a wind turbine, wherein the other of the first 10 and the second member 11 is arranged on a hub, or both the first and second member 10, 11 may be parts of a turbine blade 6. It is however explicitly mentioned that the assembly according to the invention is not limited to offshore use, nor to wind turbine applications alone.

Although the Figures show embodiments wherein the clamping device 23 is arranged inside the second member 11, the skilled person will understand that an axial insertion of the connector 19 into an associated channel 18 may also be performed by a clamping device 23 that is arranged outside the first and/or second members 10, 11. A clamping device 23 arranged outside the first and/or second members 10, 11 provides the additional advantage that it may easily be removed afterwards, and possibly re-used for arranging connectors 19 of further assemblies.

It is remarked that in the description of the shown embodiments, the lower member is denoted as the first member 10, and that the upper member is denoted as the second member 11. The skilled person will understand that the lower member could be interpreted as a second member 11 and the upper member could be interpreted as a first member 10 within the scope of the invention.

It should be understood that where features mentioned in the appended claims are followed by reference signs, such signs are included solely for the purpose of enhancing the intelligibility of the claims and are in no way limiting on the scope of the claims. The scope of the invention is defined solely by the following claims.

The invention claimed is:

1. An assembly, comprising:
   a first member and a second member that are tubular members of a wind turbine support structure, wherein;
   the second member has a fork-shaped cross section with a main body arranged between two substantially parallel walls that each comprise at least one through hole; and
   the first member is arranged between the two walls of the second member, having the through hole;
   wherein a through hole of the first member and the through holes of the second member define a channel;
   a connector that is axially insertable in said channel to an end position and consecutively expandable radially relative to said channel, to connect the first member and the second member relative to each other; and
   an actuator configured to move said connector in an axial direction in said channel;
   wherein the connector, in an expanded state thereof, pushes the first member in a radial direction relative to said channel against a face of the main body of the second member to define a clamping contact and thereby a pre-tensioned connection in said radial direction relative to said channel between a face of the first member and the face of the main body of the second member; and
   wherein the actuator is configured to consecutively:
   insert said connector into said channel from a first side;
   move said connector in the axial direction in said channel to the end position; and
   actuate the connector from the same first side to expand the connector radially relative to said channel and thereby connect the first member and the second member relative to each other.

2. The assembly according to claim 1, further comprising a stop configured to set the end position of the connector relative to said channel.

3. The assembly according to claim 2, wherein the connector comprises:
   at least one expansion block; and
   at least one wedge having an inclined surface facing the at least one expansion block;
   wherein the actuator is configured to displace the wedge relative to the expansion block; and
   wherein the stop is arranged on the at least one expansion block.

4. The assembly according to claim 2, wherein at least one of:
   the stop comprises an abutment that is configured to abut against one of the first member and the second member; and
   the stop is defined by a maximum elongation or displacement of the actuator.

5. The assembly according to claim 1, wherein at least one of:
   the connector, in the expanded state thereof, pushes against faces of the through holes of the second member that are directed away from the main body thereof to define the pre-tensioned connection between the first member and the second member; and
   in the expanded state of the connector, wherein the connection between the first member and the second member is pre-tensioned, the through hole of the first member is arranged at an offset relative to the through holes in the second member.

6. The assembly according to claim 1, wherein the connector comprises:
   a compacted state, wherein the connector has a size that is freely insertable into and out of the channel; and
   a connecting state, wherein the connector is expanded in the channel to connect the first member and the second member relative to each other.

7. The assembly according to claim 1, wherein the connector comprises:
   at least one expansion block; and
   at least one wedge having an inclined surface facing the at least one expansion block;
   wherein the actuator is configured to displace the wedge relative to the expansion block.

8. The assembly according to claim 7, wherein the expansion block has a surface of which at least a portion is a contact surface with the wedge having an orientation corresponding with the inclined surface of said wedge.

9. The assembly according to claim 1, comprising one or more than one further connector, wherein the actuator is arranged between the connector and the one or more than one further connector, wherein each of the connector and the one or more than one further connector is inserted into its own channel.

10. The assembly according to claim 9, wherein the actuator is at least one of:
- configured to simultaneously move said connector and at least one or more than one further connector in an axial direction of their associated channels; and
- arranged in a clamping device.

11. The assembly according to claim 1, wherein the actuator comprises one or more than one hydraulic cylinder.

12. The assembly according to claim 11, wherein the actuator comprises more than one hydraulic cylinder connected to a common pressure supply that is configured to move said hydraulic cylinders simultaneously.

13. The assembly according to claim 1, wherein the first member and the second member are overlapping tubular members and the through holes are radially aligned relative to the tubular members to define the channel that is radially extending.

14. The assembly according to claim 1, wherein at least one of:
- said channel has an elongate cross section extending in a longitudinal direction of at least one of said first member and said second member;
- multiple channels and connectors are arranged along a circumference of the first member and the second member; and
- the second member comprises an assembly of the main body and the two substantially parallel walls.

15. A method of assembling a first member and a second member that are tubular members of a wind turbine support structure and each comprise at least one through hole, wherein the second member has a fork-shaped cross section with a main body arranged between two substantially parallel walls that each comprise at least one through hole, said method comprising the steps of:
- arranging the first member between the two walls of the second member;
- positioning the through holes of the first member and the second member to define a channel;
- inserting a connector into the channel to an end position;
- expanding said connector radially relative to said channel, to thereby connect the first member and the second member relative to each other,
- moving said connector in an axial direction in said channel by an actuator after the step of inserting the connector into the channel and prior to the step of expanding said connector radially relative to said channel;

wherein the step of expanding said connector radially relative to said channel, to thereby connect the first member and the second member relative to each other, causes the expanded connector to push the first member in a radial direction relative to said channel against a face of the main body of the second member to define a clamping contact and thereby a pre-tensioned connection in a radial direction relative to said channel between a face of the first member and the face of the main body of the second member; and wherein the step of inserting the connector into the channel to the end position comprises the steps of:
the actuator inserting said connector into said channel from a first side; and the actuator moving said connector in the axial direction in said channel to the end position from said same first side.

16. The method according to claim 15, further comprising the step of:
setting the end position of the connector relative to said channel by a stop.

17. The method according to claim 16, wherein:
the step of moving said connector in the axial direction in said channel by the actuator is performed until the connector reaches its end position as defined by the stop; and
the step of expanding said connector radially relative to said channel is performed upon further actuation of the actuator once the connecter has reached its end position.

18. The method according to claim 15, wherein the step of expanding said connector radially relative to said channel comprises the actuator actuating the connector from the same first side, thereby expanding the connector radially relative to said channel and connecting the first member and the second member relative to each other.

* * * * *